(12) United States Patent
Shekhar et al.

(10) Patent No.: US 9,251,361 B1
(45) Date of Patent: Feb. 2, 2016

(54) DATA TRANSMISSION TO AN UNTRUSTED ENTITY

(71) Applicant: Amazon Technologies, Inc., Reno, NV (US)

(72) Inventors: Shashank Shekhar, Seattle, WA (US); Teresa Shuk Kwan Lau, Bellevue, WA (US); Jay Austin Crosley, Redmond, WA (US); Oleg Oleg Pistolet, Seattle, WA (US); Satish Kumar Eerpini, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 98 days.

(21) Appl. No.: 14/106,373

(22) Filed: Dec. 13, 2013

(51) Int. Cl.
   *G06F 21/62* (2013.01)

(52) U.S. Cl.
   CPC .................................. *G06F 21/6209* (2013.01)

(58) Field of Classification Search
   None
   See application file for complete search history.

(56) References Cited

U.S. PATENT DOCUMENTS

| | | | |
|---|---|---|---|
| 2001/0047400 A1* | 11/2001 | Coates et al. | 709/219 |
| 2004/0153451 A1* | 8/2004 | Phillips et al. | 707/8 |
| 2006/0120526 A1* | 6/2006 | Boucher et al. | 380/247 |
| 2011/0035360 A1* | 2/2011 | Reynolds | 707/640 |
| 2012/0215811 A1* | 8/2012 | Tipper et al. | 707/781 |
| 2013/0254537 A1* | 9/2013 | Bogorad | 713/165 |
| 2014/0047236 A1* | 2/2014 | Russell et al. | 713/168 |

* cited by examiner

*Primary Examiner* — Michael R Vaughan
(74) *Attorney, Agent, or Firm* — Kilpatrick Townsend & Stockton LLP

(57) ABSTRACT

Techniques for transmitting data to an entity may be provided. In particular, a location of a data file (e.g., image, text, multimedia file, document, blog entry, identifying user information) can be provided to a location of a transitive file storage device for the entity to retrieve, instead of providing the data file directly to the entity. The entity can then provide the data file to users (e.g., via a hosted network page) and/or provide the data file to a service provider along with code to enable the service provider to provide the data file to users.

24 Claims, 9 Drawing Sheets

DATA TRANSMISSION TO AN UNTRUSTED ENTITY

BACKGROUND

Providers of network pages frequently have their network pages provided in a networked environment by network page hosts that offer web hosting services. In some instances, the providers may generate network page instructions for implementing the network pages they provide. The providers may send the network page instructions to the host, so that the host can display the network page appropriately, without generating their own network page instructions for the provider. However, the host may not know whether the instructions are malicious, creating potential vulnerability for the host.

BRIEF DESCRIPTION OF THE DRAWINGS

Various embodiments in accordance with the present disclosure will be described with reference to the drawings, in which.

DETAILED DESCRIPTION

Figure 1:
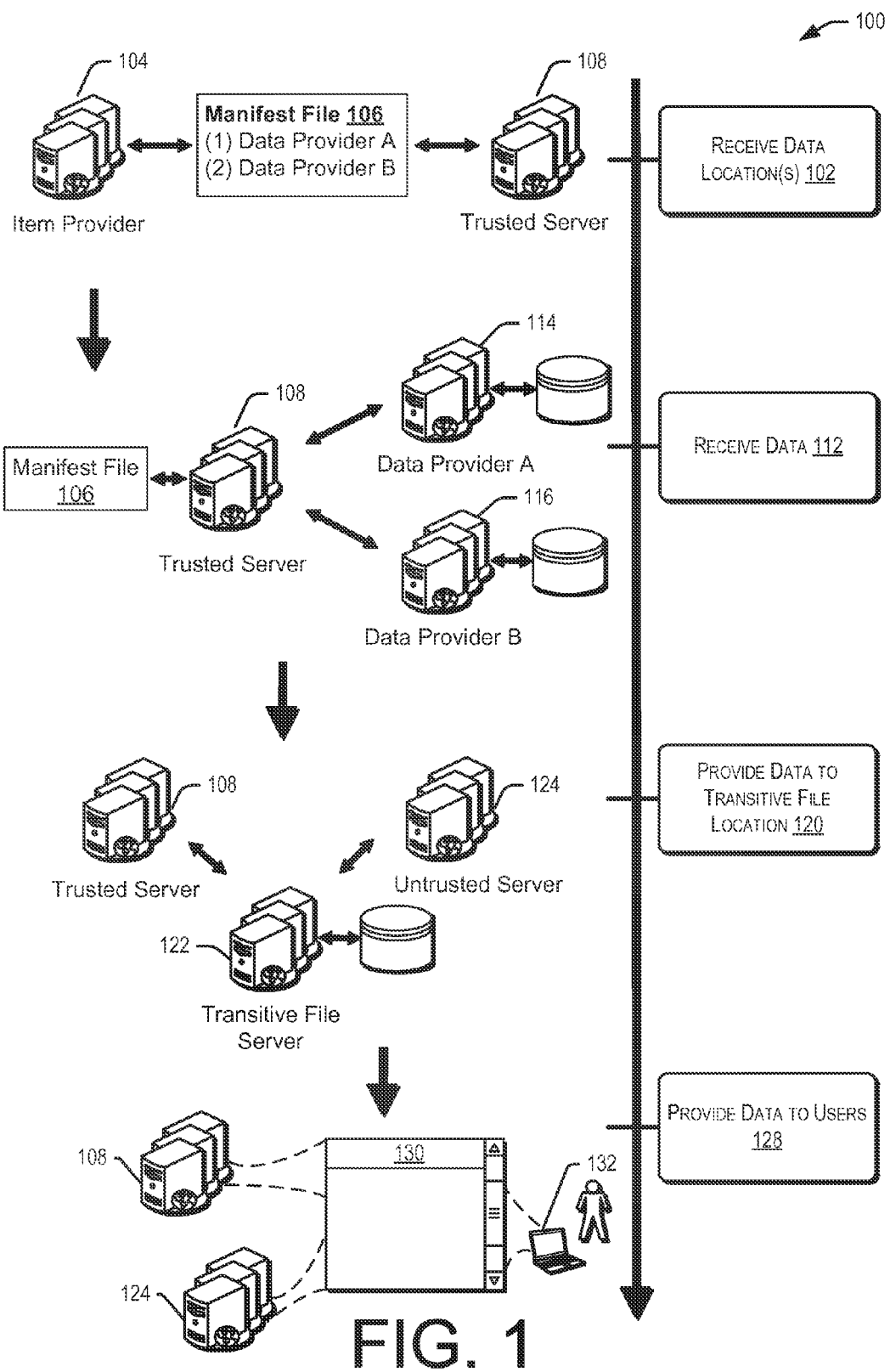
FIG. 1 illustrates an illustrative flow for providing data transmissions to an untrusted entity described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for providing data transmissions to an untrusted entity. In particular, a location of a data file (e.g., an image, text, a multimedia file, a document, a blog entry, user information, etc.) can be provided to a transitive file location for the untrusted entity to retrieve, instead of providing the data file directly to the untrusted entity. The untrusted entity can then provide the data file to users (e.g., via a hosted network page).

In a non-limiting example, an item provider may start with a network page that they would like an entity to host (e.g., on the Internet). The item provider may provide instructions (e.g., HTML instructions, server-side scripting instructions, etc.) to an untrusted server so that the untrusted server may be able to know what the item provider would like the page to look like. The item provider may also provide a manifest file of instructions to a trusted server, so that the trusted server can determine where to obtain the data for their network page (e.g., images, blog entries, text, etc.). The trusted server can gather the data from the data providers and provide the data to a transitive file server. The untrusted entity may receive a notification of the location(s) of the data and retrieve the data from the transitive file server. The untrusted server can then host the item provider's network page using the instructions and received data.

A trusted entity (e.g., a trusted server, a trusted computer, etc.) may be a computer that provides data for one or more entities. The original locations of the data can be identified in a manifest file provided to the trusted server from locations that provide non-executable data to the trusted server (e.g., free from malicious and/or fraudulent executable instructions). In some examples, the trusted server may be a providing entity of the data, or interact with data providers that can provide the data for the trusted server.

An untrusted entity (e.g., untrusted server, untrusted computer) may be a computer that accesses the data to provide the data as part of a hosted network page. The untrusted entity/ server may interact with a user to provide an item provider's hosted network page to the user. The untrusted entity may receive a key (e.g., symmetric key) to provide appropriate authentication credentials before the untrusted entity is permitted to access the data as part of a hosted network page. In some examples, the untrusted entity may be untrusted because the trusted entity or a service provider has not verified code associated with the untrusted entity, has a low level of trust associated with the untrusted entity, and/or is unaware of a level of trust associated (or that should be associated) with the untrusted entity. Additionally, in some examples, the code (e.g., computer-executable code to be hosted or otherwise executed by the trusted entity or a service provider) may be untrusted in that it was sourced, created, or otherwise provided by an untrusted entity or an entity with little or no level of trust associated therewith.

A transitive file location (e.g., transitive file server, transitive file computer) may be a location that provides data for a transitory amount of time. For example, the transitive file server may receive a data file from a trusted server, provide the data file to an untrusted server, and discontinue providing storage for the data file after the data file has been accessed by the untrusted server (e.g., clearing the data from and/or dereferencing the data of the transitory file location). In some examples, the transitive file server is configured to provide data independent of identifying the providing entity or configured to refrain from providing the origin of the data file to a requester.

A hash function may map data from one state to a different state (e.g., locations, data stores, results of a hash function). For example, the hash function can receive an identification of a data file (e.g., file name, a PIN, location portion) and a key from an untrusted server. The hash function can calculate results from the hash function to generate a location (e.g., address) in a data store. The process may be automatic. In some embodiments, an API server and/or API module implemented at a trusted server (or separate from a trusted server) can access the data stored at the location (e.g., at a persistent data store) and provide the data to a transitive file server and/or hash table accessible by the transitive file server. In some embodiments, the hash function can help ensure that data is accessible by entities that can provide a correct key (e.g., symmetric key) for authentication, or other input for a hash function to generate a location for data.

A manifest file can identify one or more locations of data (e.g., original location, originating data provider). For example, an item provider may provide the manifest file to the trusted server so that the trusted server can receive the data that the item provider would like to incorporate with their hosted network page. The trusted server may access the locations listed in the manifest file to the receive data. In some examples, the manifest file identifies originating locations of data files, so that the trusted server can access the data files and place the data in a persistent data store that is accessible at a later time (e.g., when the data is requested by an untrusted server).

FIG. 1 illustrates an illustrative flow for providing data transmissions to an untrusted entity described herein, according to at least one example. In a non-limiting example, the method 100 can receive data location(s) 102. For example, an item provider computer 104 can provide a manifest file 106 to a trusted server 108. The manifest file 106 can identify one or more data providers that provide data associated with an item provider. In some examples, the manifest file 106 can include a location of a data file. The data file may be an electronic file, a stream of information, and/or other types of transmissions of data from a data provider.

The method 100 may receive the data 112. For example, the trusted server 108 may identify a first data location (e.g., at data provider A 114) from the manifest file 106, communicate with the location, and receive the data. The trusted server 108 may interact with more than one location, including a second data location (e.g., data provider B 116) identified by the manifest file 106 to receive additional data from more than one location. The data may include images, text, multimedia data, blog entries, user information, item information, or other data associated with an item provider.

In some examples, the trusted server 108 may communicate with the data providers by transmitting one or more requests to the data providers for the data. The request may ask for a particular data file that contains the data, streaming data, data located at a distributed data store, and/or other methods of receiving data.

The method 100 may provide data to a transitive file location 120. In some examples, the trusted server 108 may store the data received from the data providers with the transitive file server 122. The transitive file server 122 may store the data received from the trusted server 108 in a data store and/or hash table.

In some examples, the trusted server 108 may store a copy of the data received from the data providers with a persistent data store (not shown). The trusted server 108 (e.g., via an API module) and/or an API server may provide a copy of the data to the transitive file server 122 in response to a request. Details and features associated with this example are provided in relation to FIG. 3.

In some examples, a trusted server 108 may provide a location and/or a key to the untrusted server 124 without waiting for the untrusted server 124 to request the location and/or key. For example, the trusted server 108 can calculate a key (e.g., symmetric key, authentication key) and provide the key to the untrusted server 124. The trusted server 108 can also store data with the transitive file server 122. The location can be associated with a hash function, so that the results of the hash function may identify the location of the data stored with the transitive file server 122. When the data is be stored with the transitive file server 122, the untrusted server 124 can be notified of the location of the data with the transitive file server 122. In some examples, the trusted server 108 can transmit a notification to the untrusted server 124 that includes both the key and the location of the data.

In some examples, an untrusted server 124 may request the data from the transitive file server 122 (e.g., transitive file location). In some examples, the untrusted server 124 may provide a location and/or a key to the transitive file server 122. The location can be associated with a hash function, so that the results of the hash function may identify the location of the data stored with the transitive file server 122. The transitive file server 124 can access the data and provide the data to the untrusted server. In some examples, a notification can be transmitted to the untrusted server 124 that includes an identification of the location of the data in the transitive file server 122.

The untrusted server may be configured to retrieve the data from the location. In some examples, the untrusted server 124 can retrieve the data file from the transitive file server 122 independent of identification of a providing entity. For example, the data provided to the transitive file server 122 may be submitted via a user datagram protocol (UDP). In some examples, the untrusted server 124 can retrieve the data file from the transitive file server 122 by submitting the key and/or location of the data, and retrieving the data stored in the particular location.

The data may be removed from the transitive file server 122. For example, the data may have been provided to a transitive file location that customarily removes data once the data is accessed and/or received by a third party, so that when the untrusted server 124 accesses or retrieves the data from the transitive file server 122, the data can be removed from that location.

The method 100 may include providing the data to users 128. For example, the untrusted server 124 and/or trusted server may provide information to a network page 130 accessible by a user 132, including data retrieved from the transitive file server (e.g., from the untrusted server 124), text or other non-executable data (e.g., from the trusted server 108), or other information provided by a host of web hosting services (e.g., untrusted server 124 and/or trusted server 108).

Figure 2:
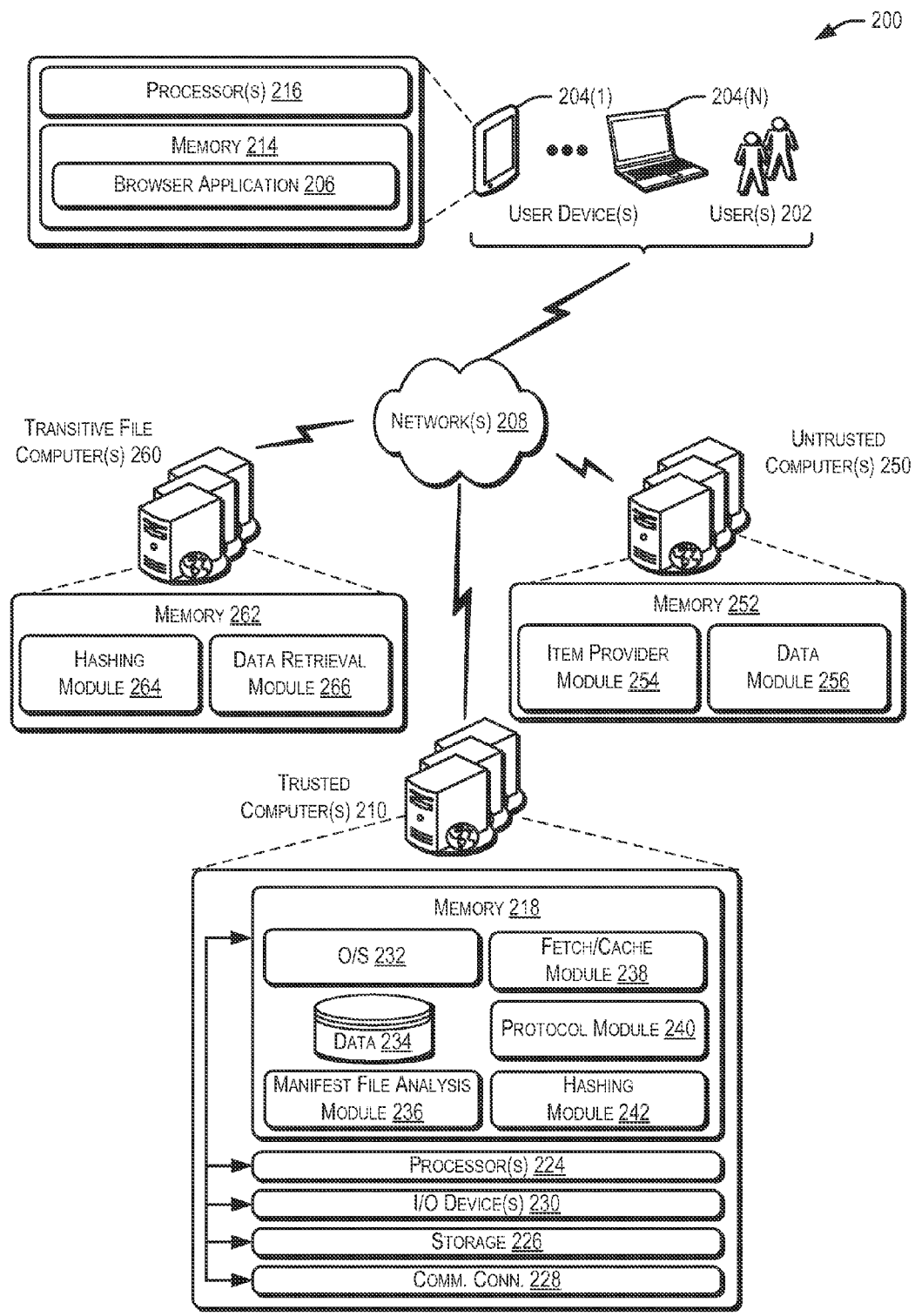
FIG. 2 illustrates an example architecture for providing data transmissions to an untrusted entity described herein that includes a trusted system, an untrusted system, a transitive file system, and/or a user device connected via one or more networks, according to at least one example.

FIG. 2 illustrates an example architecture for providing data transmissions to an untrusted entity described herein that includes a trusted system, an untrusted system, a transitive file system, and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers, one or more trusted computers 210, one or more untrusted computers 250, and/or one or more transitive file computers 260. The one or more trusted computers 210, one or more untrusted computers 250, and/or one or more transitive file computers 260 may, in some examples, provide computing resources such as, but not limited to, client entities, low latency data storage, durable data storage, data access, management, virtualization, cloud-based software solutions, electronic content performance management, etc. The one or more trusted computers 210, one or more untrusted computers 250, and/or one or more transitive file computers 260 may also be operable to provide web hosting, computer application development, and/or implementation platforms, combinations of the foregoing, or the like to the one or more users 202. The one or more trusted computers 210, one or more untrusted computers 250, and/or one or more transitive file computers 260, in some examples, may provide data transmissions to untrusted entities.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the one or more trusted computers 210, one or more untrusted computers 250, and/or one or more transitive file computers 260 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more trusted computers 210, one or more untrusted computers 250, and/or one or more transitive file computers 260, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the one or more trusted computers 210, one or more untrusted computers 250, and/or one or more transitive file computers 260 via the networks 208, or via other network connections. Additionally, the user devices 204 may be part of the distributed system managed by, controlled by, or otherwise part of the one or more trusted computers 210, one or more untrusted computers 250, and/or one or more transitive file computers 260 (e.g., a console device integrated with the trusted computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the one or more trusted computers 210, one or more untrusted computers 250, and/or one or more transitive file computers 260. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the one or more trusted computers 210, one or more untrusted computers 250, and/or one or more transitive file computers 260 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more trusted computers 210, one or more untrusted computers 250, and/or one or more transitive file computers 260 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the one or more trusted computers 210, one or more untrusted computers 250, and/or one or more transitive file computers 260 may be in communication with the user devices 204 and/or other service providers via the networks 208, or via other network connections. The one or more trusted computers 210, one or more untrusted computers 250, and/or one or more transitive file computers 260 may include one or more servers, perhaps arranged in a cluster, as a server farm, or as individual servers not associated with one another. These servers may be configured to implement the data transmission to an untrusted entity described herein as part of an integrated, distributed computing environment.

In one illustrative configuration, the trusted computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of trusted computers 210, the memory 218 may be volatile (such as RAM) and/or non-volatile (such as ROM, flash memory, etc.). The trusted computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the trusted computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the trusted computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The trusted computers 210 may also contain communications connection(s) 228 that allow the trusted computers 210 to communicate with a stored database, another computing device or server, user terminals and/or other devices on the networks 208. The trusted computers 210 may also include I/O device(s) 230, such as a keyboard, a mouse, a pen, a voice input device, a touch input device, a display, speakers, a printer, etc.

It should be appreciated that the one or more untrusted computers 250 and/or one or more transitive file computers 260 may also include processor(s), I/O device(s), storage, communications connection(s), operating system, data store(s), application program(s), services, or other aspects not explicitly illustrated in FIG. 2, including aspects discussed in relation to a trusted computer 210.

Turning to the contents of the memory 218 in more detail, the memory 218 may include an operating system 232, one or more data stores 234, and/or one or more application programs or services for implementing the features disclosed herein including a manifest file analysis module 236, a fetch/cache module 238, a protocol module 240, and/or a hashing module 242. In some examples, the manifest file analysis module 236 may be configured to receive a location of a data file. The location of the data file can be included in a manifest file received from an item provider. In some examples, the location of the data file can be received at the computer system (e.g., trusted server 210).

The manifest file analysis module 236 may also be configured to determine credentials for the trusted server 210 to interact with data provider(s). For example, the trusted server 210 may submit a user name, PIN, key, or other identifying information to access the data from the data provider(s). In some examples, credentials may not be required to interact with the data provider(s).

The manifest file analysis module 236 may also be configured to identify any data that the untrusted server needs to provide hosting services for the item provider. The manifest file analysis module 236 may be configured to analyze the data requested in the manifest file and determine the data needed by the untrusted computer 250 to host a network page for an item provider. In some examples, the item provider can provide information about the network page to the untrusted computer (e.g., via the item provider module 254), so that the untrusted computer 250 can host the network page, provide hosting services for the item provider, or offer other services. Some of the information may be included and/or analyzed using the manifest file.

The memory 218 may also include a fetch/cache module 238. The fetch/cache module 238 may be configured to provide credentials and/or locations to the data provider(s). In some examples, the location of the data may identify a data provider and the data requested (e.g., file name), while the data provider locates the data. In some examples, the location may be a physical location of the data file (e.g., IP address, hash table location, data store location) at a data store managed by a data provider.

The fetch/cache module 238 may also be configured to identify one or more data providers. For example, some data providers may include network pages, an item provider computer, a user device, social networking providers (e.g., Twitter®, Facebook®), data stores, or other providers of information.

The fetch/cache module 238 may also be configured to store or cache data in a data store 234, a distributed server, a trusted server, an application programming interface (API) server, or at a transitive file server. The data store may be a persistent data store or a transitive data store. For example, the data may be stored in a particular location at the data store, including a location associated with the results of a hash function determined by the hashing module 242 or the associated with an automatic process for generating the file location.

The fetch/cache module 238 may also be configured to provide an application programming interface (API) to receive data. For example, the fetch/cache module 238 can provide the API to receive data, interact with requests to receive data, or place data in a data store after receiving a request for data. The request may be received from an untrusted entity implementing a data module 256.

The memory 218 may also include a protocol module 240. The protocol module 240 may be configured to transmit or place data in a location using a particular protocol. For example, the protocol module 240 may utilize UDP, PCP, or TCP to transmit data. In some examples, user datagram protocol (UDP) transmissions can provide data to a server or data store via an internet protocol (IP) network without prior communications to set up special transmission channels or data paths. The UDP transmission may be connectionless, emphasize low-overhead operation, and provide reduced latency. The UDP transmission may be one type of transmission protocol that transmits data independent of identifying a providing entity. In some examples, transmission control protocol (TCP) transmissions can provide data to a server or data store via an IP network by detecting potential issues with transmitting data and requesting retransmission of lost data or rearranging out-of-order data. In some examples, port control protocol (PCP) transmissions can help control data forwarding by other servers, devices, firewalls, or other systems/computers.

The protocol module 240 may also be configured to provide a data file, a copy of a data file, or other information to a transitive file location via a user datagram protocol (UDP). The transitive file location can be associated with the transitive file computer 260, including a hash table, data store, or other storage medium.

The memory 218 may also include a hashing module 242. The hashing module 242 may be configured to identify a location for a data file based in part on a hash function. The hashing module 242 may also be configured to identify results of the hash function. The results of the hash function can help identify a location of a data file in a hash table or data store. In some examples, the hashing module 242 may be configured to determine a location based in part on the results of the hash function and a key provided by the requester.

The hashing module 242 may also be configured to provide information for a multifactor authentication process. For example, the hashing module 242 can calculate a key, personal identification number (PIN), location, or file name ("key") to the untrusted computer 250. The hashing module may be configured to transmit the key to the untrusted computer 250. The key may be a symmetric key used in part to identify the untrusted computer 250 as an entity that is allowed to access the data and/or data file. The transitive file computer can retrieve the data from a hash table based in part on the multifactor authentication process, including identifying a location from the request and accessing the data at the particular location.

In one illustrative configuration, the untrusted computers 250 may include at least one memory 252 and one or more processing units (or processor(s)). The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described. The memory 252 may store program instructions that are loadable and executable on the processor(s), as well as data generated during the execution of these programs. Depending on the configuration and type of untrusted computers 250, the memory 252 may be volatile (such as RAM) and/or non-volatile (such as ROM, flash memory, etc.).

Turning to the contents of the memory 252 in more detail, the memory 252 may include an operating system, one or more data stores, and/or one or more application programs or services for implementing the features disclosed herein including an item provider module 254 and/or a data module 256. In some examples, the item provider module 254 may be configured to communicate with an item provider. The item provider may be an entity that provides a network page (e.g., users, consumers, merchants).

The item provider module 254 may also be configured to host a network page for an item provider. In some examples, the item provider can provide information about the network page to the untrusted entity, so that the untrusted entity can host the network page, provide web hosting services for the item provider, or offer other services.

The item provider module 254 may also be configured to generate a manifest file or receive a manifest file from an item provider. In some examples, the item provider module 254 at the untrusted computer 250 may communicate with the manifest file analysis module 236. For example, when the item provider module 254 generates the manifest file for the item provider, the manifest file can be received by the trusted computer 210 and analyzed by the manifest file analysis module 236 to determine one or more locations of data. In some examples, the manifest file can include an originating network location of the data file (e.g., a location of the data file before the data file is provided to the file location at the transitive file computer 260).

The item provider module 254 may also be configured to receive instructions from an item provider so that the untrusted server will know what the item provider would like its page to look like. The instructions can be provided in hypertext markup language (HTML), extensible markup language (XML), server-side scripting language (e.g., JavaScript®), or other suitable formats. In some examples, the untrusted entity (e.g., untrusted computer 250) can receive instructions from the item provider and provide web hosting services for the item provider based in part on the instructions. In some examples, the instructions enable the untrusted entity to retrieve images, text, or multimedia data for the item provider.

The memory 252 may also include a data module 256. The data module 256 may be configured to receive a request for a network page from a user. For example, the user can initiate a request by selecting a link with the untrusted computer 250, opening a network page, browsing to a particular location on a network page, or other actions that may be received at the untrusted server. In some embodiments, the activation may occur automatically so that the untrusted computer 250 starts the process without an interaction with a user.

The data module 256 may also be configured to receive a key. The key may be received via a push notification or received without a request from the untrusted computer 250. In some embodiments, the key may be received with the location of the data without first requesting the data. The data module 256 can identify the key and provide the key to the transitive file computer 260. The transitive file computer 260 can authenticate the untrusted computer 250 and allow the untrusted computer 250 to access the data identified by the location.

The data module 256 may also be configured to receive a location corresponding to the request from a trusted computer 210 or API (not shown). The data module 256 can identify the location and request the data from the transitive file computer 260 at a particular location.

The data module 256 may also be configured to generate a request and transmit the request to a trusted server 210 or API (not shown). For example, the data module 256 can associate the activation with instructions to request data, and transmit the request to the trusted server 210 or API.

The data module 256 may also be configured to receive a notification. The notification can include a key and/or location of the data. The data module 256 may be configured to analyze the notification (e.g., decrypt, parse, calculate) to determine the key and/or location identified by the notification. In some embodiments, the location may be used to identify a location (e.g., transitive file location) of data for the untrusted computer 250 to use for hosting services for the item provider.

The data module 256 may also be configured to provide information for a multifactor authentication process. For example, the data module 256 can submit a request that includes a personal identification number (PIN), location, file name, or a key. The key may be a symmetric key used in part to identify the untrusted computer 250 as an entity that is allowed to access the data and/or data file. The transitive file computer can retrieve the data from a hash table based in part on the multifactor authentication process, including identifying a location from the request and accessing the data at the particular location.

In one illustrative configuration, the transitive file computers 260 may include at least one memory 262 and one or more processing units (or processor(s)). The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described. The memory 262 may store program instructions that are loadable and executable on the processor(s), as well as data generated during the execution of these programs. Depending on the configuration and type of transitive file computers 260, the memory 262 may be volatile (such as RAM) and/or non-volatile (such as ROM, flash memory, etc.).

Turning to the contents of the memory 262 in more detail, the memory 262 may include an operating system, one or more data stores, and/or one or more application programs or services for implementing the features disclosed herein including a hashing module 264 and/or a data retrieval module 266. In some examples, the hashing module 264 may be configured to identify a location for a data file based in part on a hash function. The hashing module 264 may also be configured to identify results of the hash function. The results of the hash function can help identify a location of a data file in a hash table or data store. In some examples, the hashing module may receive a key from an untrusted computer 250, determine the location of the data based in part on the key (e.g., using a hash function to decode the key and determine the location, a symmetric key, an authentication key), and locate the data at the location identified by the untrusted computer 250.

The memory 262 may also include a data retrieval module 266. The data retrieval module 266 may be configured to access a hash table or data store in response to receiving a key. For example, the hashing module 264 may determine a location of the data associated with a key, and the data retrieval module 266 may retrieve the data identified at the location. The data retrieval module 266 may also be configured to locate data identified by a calculated key and/or location from the trusted computer 210.

The data retrieval module 266 may also be configured to access a hash table or data store in response to a request. In some examples, the data retrieval module 266 may be configured to provide a mailbox (e.g., "mailbox server"). For example, the data retrieval module 266 can receive information from a trusted entity, place the information in a known location, and allow an untrusted entity to access the information at the known location. In some examples, the file location is located at a data store associated with the mailbox server.

The data retrieval module 266 may also be configured to clear, delete, write-over, or remove data from a data store. For example, the data retrieval module 266 can determine that data has been accessed from a particular location and clear the memory space at the hash table. In some examples, the data retrieval module 266 can receive a request to clear data from a particular location and clear the memory space at the hash table. In some examples, the particular location can be a transitive file location and the data file provided at the file location is removed after the untrusted entity retrieves the data file.

The data retrieval module 266 may also be configured to limit accessibility of a data store. For example, the location may be inaccessible by the untrusted server 250 when the data file is provided to or retrieved from the location (e.g., "atomic"). In another example, the file location is inaccessible by an untrusted entity when the data file is provided to a file location.

Figure 3:
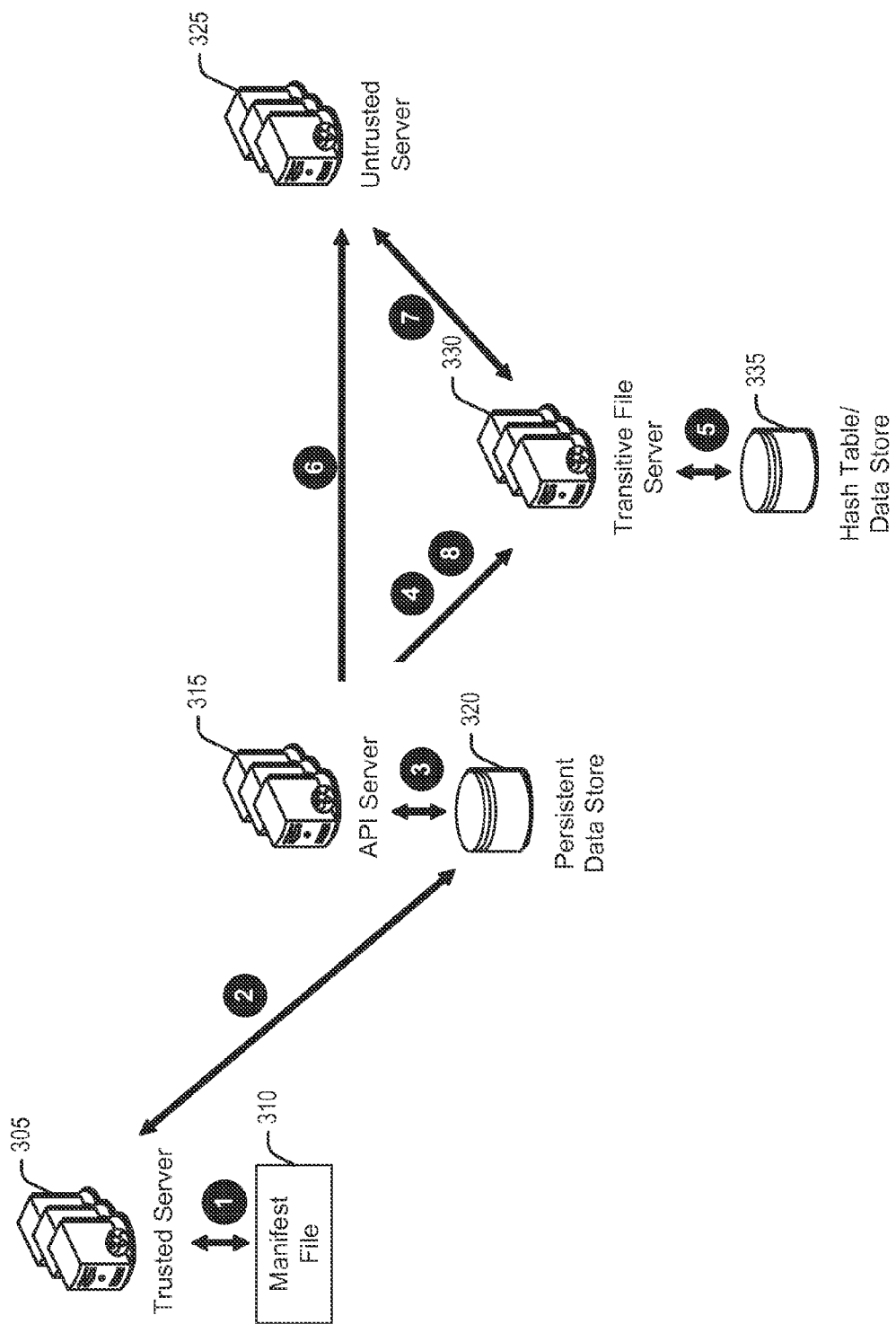
FIG. 3 illustrates an illustrative flow for providing data transmissions to an untrusted entity according to at least one example.

FIG. 3 illustrates an illustrative flow for providing data transmissions to an untrusted entity according to at least one example. For example, the data transmission may be separated into an onboarding process, to gather information for the item provider, and a live process, to provide information for the item provider and/or users. In some embodiments, the onboarding process may include blocks 1-3 and the live process may include blocks 4-10.

At block 1, the trusted server 305 receives the manifest file 310 from the item provider (not shown). The manifest file 310 can include one or more locations that include data files (e.g., data providers). In some examples, the manifest file 310 may include substantially all data needed by the untrusted server 325 in order to provide hosting services. For example, the manifest file 310 can include one or more data locations that identify data proactively, for example, so that the untrusted server 325 would not need to request the data at a later time.

At block 2, the trusted server 305 receives of the data files from data providers. The data providers can be accessible through one or more network connections. The trusted server 305 can provide the copies of the files to a persistent data store 320. The persistent data store 320 may be a data store that stores one or more data files from one or more locations for more than a transitory amount of time.

At block 3, the application programming interface (API) server 315 becomes aware of the data file in the persistent data store 320 and associates results of a hash function (e.g., an algorithmic hash) to the data file. In some embodiments, the results of the hash function may be used as a document identifier, or location of the data file.

In some embodiments, the functionality of the API server 315 may be located within and/or in association with the trusted server 305. For example, the API server 315 may be implemented as a module and/or an API provided by the trusted server 305. In some examples, the data may be cached at a distributed server, a trusted server, an application programming interface (API), an API server, and/or a transitive file server, or data store associated therewith.

In some embodiments, user can initiate an untrusted server 325 request, including selecting a link with the untrusted server 325, opening a network page, browsing to a particular location on a network page, or other actions that may be received at the untrusted server 325 to start a "live" process. In some embodiments, the activation may occur automatically so that the untrusted server 325 starts the process without an interaction with a user.

In some embodiments, the untrusted server 325 may not request data (e.g., receive a push notification at block 6). In some embodiments, the untrusted server 325 may request the data. For example, the untrusted server 325 associates the activation with instructions to request data, and transmits the request to the API server 315. The request can include identifiers, timestamps, or other information that can identify what data the untrusted server 325 is requesting. In some embodiments, the request includes a request for a copy of the data file, a second algorithmic hash, a key (e.g., symmetric key, authentication key), and/or a result of a hash function. In some embodiments, the untrusted server 325 transmits the request via transmission control protocol (TCP) to the API server 315.

In some examples, the API server 315 identifies an appropriate data file to provide to the untrusted server 325. The identification of the appropriate data file can be based in part on the data provided by the trusted server 305 in response to the data referenced in the manifest file 310. In some examples, identification of the appropriate data file can be based in part on a request from the untrusted server. In some examples, the API server 315 translates the algorithmic hash from the untrusted server into results from a hash function and receives the corresponding data file from the persistent data store 320.

The API server 315 can calculate a key for the untrusted server 325. The authentication key may help identify the untrusted server 325 to the transitive file server 330 and/or provide credentials to authenticate the untrusted server 325 with the transitive file server 330.

At block 4, the API server 315 provides a copy of the data file to a transitive file server 330. In some examples, the API server 315 provides the data file to the transitive file server 330 based in part on a location associated with the results of the hash function. In some examples, the API server 315 provides a copy of the data file to the transitive file server 330 using a transfer protocol that allows the API server 315 and/or trusted server 305 to remain anonymous and/or provide data independent of identification, including via a user datagram protocol (UDP).

In some examples, the location may be inaccessible the untrusted server 325 when the data file is provided to the location (e.g., "atomic"). This may include restricting access to the transitive file server 330 while the API server 315 is transmitting data to the transitive file server 330, when the transitive file server 330 is reading, writing, and/or communicating with the hash table, or when the transitive file server 330 is communicating with another entity (e.g., the API server 315).

In some examples, the transitive file server 330 may include a mailbox server. For example, the transitive file server 330 can receive information from a trusted entity, place the information in a known location, and allow an untrusted entity to access the information at the known location.

At block 5, the transitive file server 335 stores/writes a copy of the data file to a hash table and storage 335. The location of the data file may be associated with the results of the hash function. In some embodiments, the location of the data file stored in the hash table and storage 335 may be a new location of the data file in comparison to the original locations with the data provider(s) and/or the persistent data store 320.

At block 6, the API server 315 transmits a notification to the untrusted server 325 by providing the location of the data in the hash table 335. For example, the notification can be in response to the request provided by the untrusted server 325 asking for the data file.

In some examples, the API server 315 also provides the key (e.g., authentication key, symmetric key) to the transitive file server 330. In some embodiments, the transitive file server 330 can use the key to confirm the authentication of the data requester (e.g., the untrusted server 325). In some embodiments, the transitive file server 330 can use the key to determine a location of the data in the hash table.

At block 7, the untrusted server 325 requests the data from the transitive file server 330 at a particular location. For example, the untrusted server 325 may submit a request that includes an "HTTP Get" instruction to the transitive file server 330. In some examples, the untrusted server 325 can also provide the key (e.g., an authentication key, asymmetric key, a calculated key, etc.) to the transitive file server 330. The transitive file server 330 may authenticate the untrusted server 325 as an authorized data requester. In another example, the untrusted server 325 can submit a request that includes a multifactor authentication process. The transitive file server 330 can receive the data from the hash table 335 based in part on the location provided by the untrusted server 325.

At block 8, the location of the data file at the transitive file server 330 may be cleared. For example, the API server 315 can submit a request to clear the memory space at the hash table 335 via the transitive file server 330.

Figure 4:
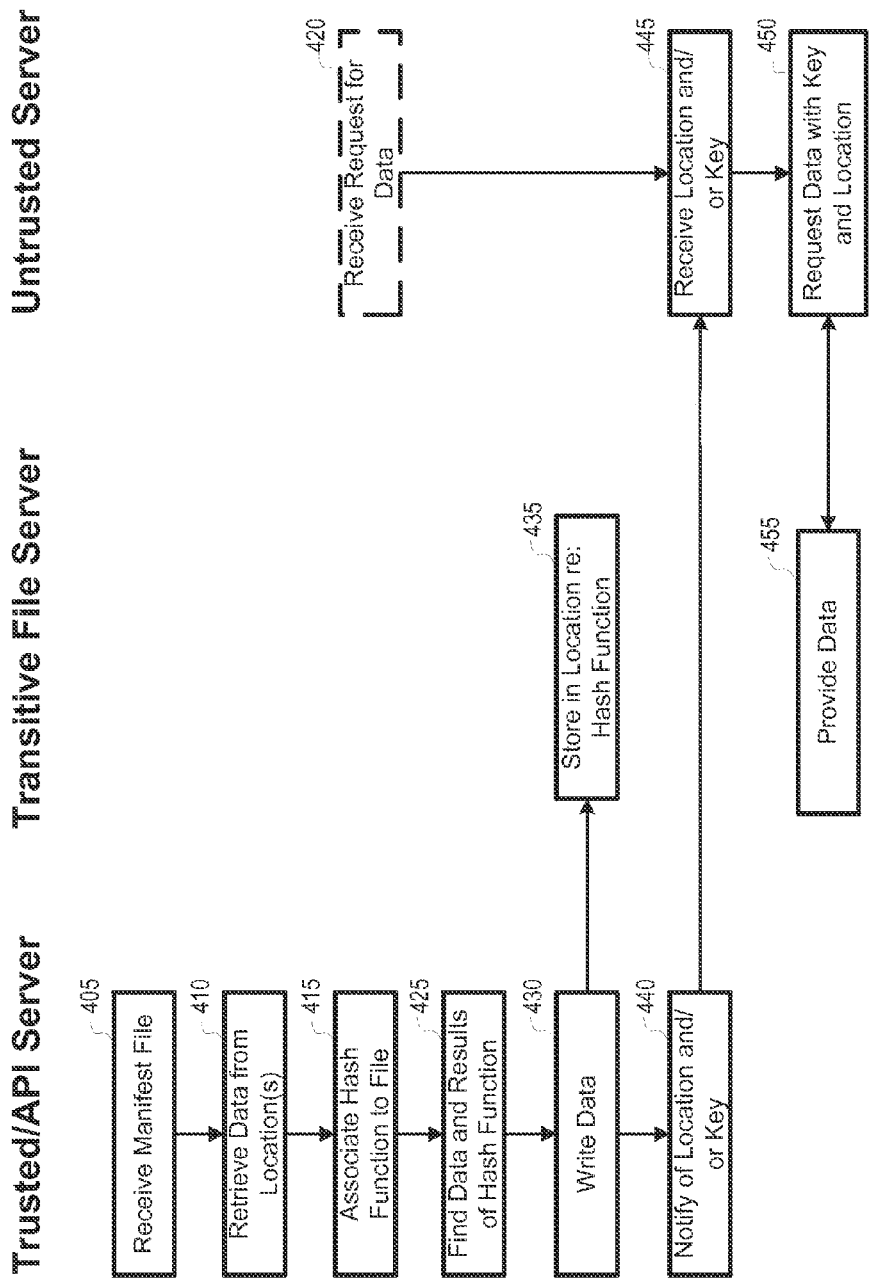
FIG. 4 illustrates an illustrative flow for providing data transmissions to an untrusted entity according to at least one example.

FIG. 4 illustrates an illustrative flow for providing data transmissions to an untrusted entity according to at least one example. For example, the data transmission can be provided using a trusted and/or API server, a transitive file server, and/or an untrusted server. In some embodiments, the trusted server may include an API, or the trusted server and API server may be separate computers.

At block 405, the trusted/API server may receive a manifest file. For example, the manifest file may be provided by an item provider to a trusted/API server. The manifest file may contain a location of a data file stored with a data provider.

At block 410, the trusted/API server retrieves data from one or more locations. For example, the trusted/API server may receive the data file from the data provider. The data file location can be based in part on the location listed in the manifest file. The data received from the data provider can be provided via the API, trusted transmission, via a network, or any other communication medium.

At block 415, the trusted/API server can associate a hash function with the data. For example, the trusted/API server can execute a hash function when the trusted/API server receives the data. The trusted/API server can identify results of the hash function for the data file that identifies a new location of the data file.

In a related process, at block 420, an untrusted server can receive a request for data. For example, the request for data can be received through an automated process to refresh data at a network page or an activation of a network page by a user. The requested data can include images, text, blog entries, items offered in an electronic marketplace, or other data provided by a network page. The request for data may identify the data to display at the network page.

At block 425, the trusted/API server finds the data and/or the results of the hash function associated with the data. For example, the trusted/API server can execute a hash function when the trusted/API server receives the request for the data. The trusted/API server can identify results of the hash function that helps to identify a location of the data file associated with the request. For example, the location of the data file may be document identifier that identifies a location in a hash table where the data file is stored. In another example, the location of the data file may be a location in a persistent storage. The trusted/API server can retrieve the data from the location.

At block 430, the trusted/API server writes the data to a transitive file server. For example, the transitive file server can be associated with a hash table, so that the location of the data file can be associated with the identification of the data file. The identification of the data file may be unique. In some examples, the trusted/API may execute a hash function, and the results of the hash function are used in part to determine the location of the data file in the transitive file server.

In some examples, the trusted/API server may write the data to the transitive file server, so that the transitive file server is unable to identify the trusted/API server. For example, the transmission may include a UDP transmission, so that the trusted/API server can send the data to the transitive file server on an internet protocol (IP) network without prior communications to set up special transmission channels or data paths.

At block 435, the transitive file server stores the data file in a location associated with the results of the hash function. For example, the results of the hash function may be X[h(100)], where X is the transitive file server, h is the hash function, and 100 is the location where the data is stored. In another example, the data file may be stored in location A200 in a data store.

At block 440, the trusted/API server notifies the untrusted server (e.g., a push notification). For example, the notification can include an identification of the transitive file location (e.g., location A200). The untrusted server may be configured to receive a copy of the data file from the transitive file location after the untrusted server receives the notification.

In some embodiments, the notification can include a key. For example, the key may be a symmetric key that authenticates the untrusted server with the trusted/API server. The symmetric key may be shared with multiple entities so that when the entity provides the symmetric key to the trusted/API server, the symmetric key can act as a password, personal identification number (PIN), or shared secret to allow the untrusted entity access to one or more services. The untrusted server may also provide authentication credentials through a multifactor authentication process. In some examples, the key may be an asymmetric key or other authentication key used to identify the untrusted server.

In embodiments, the untrusted server may request the data (e.g., not a push notification) from the trusted/API server. For example, the request may be a request for the data file, a copy of the data file, a location of the data file, a stream of data, or other requests. The request can include the symmetric key, so that the trusted/API server can authenticate the untrusted server.

At block 445, the untrusted server receives the location of the data file. This may include the transitive file location and/or the key. At block 450, the untrusted server can retrieve the data at the location. At block 455, the transitive file server provides the data to the untrusted server.

Figure 5:
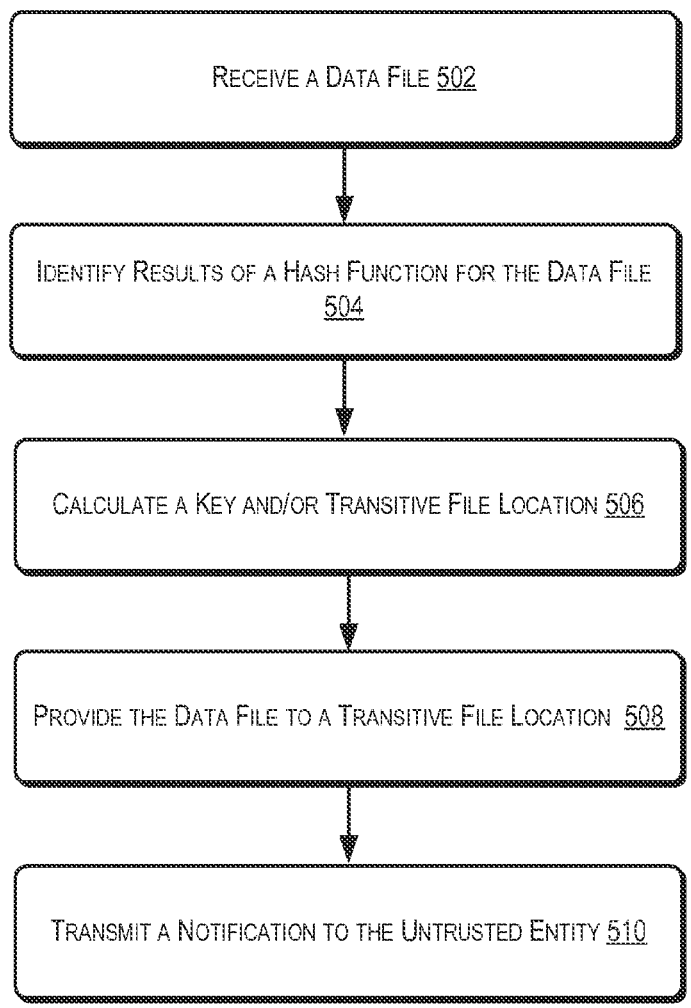
FIG. 5 illustrates an example flow diagram providing data transmissions to an untrusted entity, according to at least one example.

FIG. 5 illustrates an example flow diagram providing data transmissions to an untrusted entity, according to at least one example. In some examples, the one or more trusted computers 210 (e.g., utilizing at least one of the manifest file analysis module 236, the fetch/cache module 238, the protocol module 240, and/or the hashing module 242), the one or more untrusted computer 250 (e.g., utilizing at least one of the item provider module 254 and/or data module 256), the one or more transitive file computers 260 (e.g., utilizing at least one of the hashing module 264 and/or data retrieval module 266), or one or more user devices 204 shown in FIG. 2 may perform the process 500 of FIG. 5. The process 500 may begin at 502 by receiving a data file. For example, the data file may be received by a computer system. The data file may be received after receiving a location of the data file included in a manifest file. The manifest file may be received at the computer system from an item provider. In some examples, the data file may be a copy of a data file. At 504, the process 500 may include identifying results of a hash function for the data file. At 506, the process 500 may include calculating a key and/or transitive file location. At 508, the process 500 may include providing the data file to a transitive file location. For example, the transitive file location can be associated with the results of the hash function. Further in some examples, the process 500 may end at 510, where the process 500 may include transmitting a notification to the untrusted entity. For example, the notification can include an identification of the transitive file location. The untrusted entity may be configured to retrieve the copy of the data file from the transitive file location independent of identification of a providing entity, and configured to provide the copy of the data file to a user (e.g., via a hosted network page).

Figure 6:
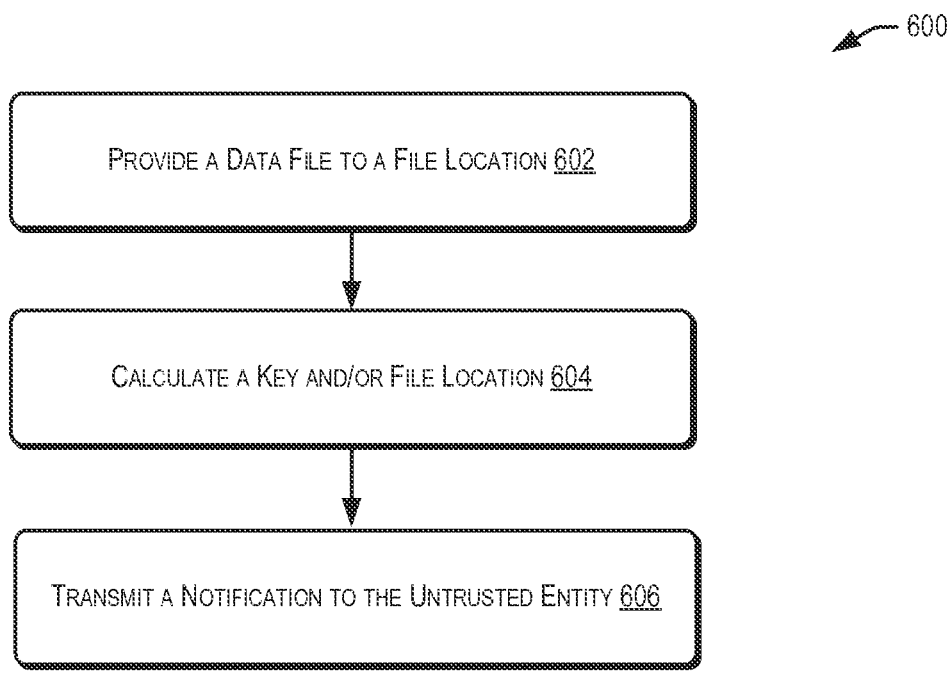
FIG. 6 illustrates an example flow diagram providing data transmissions to an untrusted entity, according to at least one example.

FIG. 6 illustrates an example flow diagram providing data transmissions to an untrusted entity, according to at least one example. In some examples, the one or more trusted computers 210 (e.g., utilizing at least one of the manifest file analysis module 236, the fetch/cache module 238, the protocol module 240, and/or the hashing module 242), the one or more untrusted computer 250 (e.g., utilizing at least one of the item provider module 254 and/or data module 256), the one or more transitive file computers 260 (e.g., utilizing at least one of the hashing module 264 and/or data retrieval module 266), or one or more user devices 204 shown in FIG. 2 may perform the process 600 of FIG. 6. The process 600 may begin at 602 by providing a data file to a file location. At 604, the process 600 may include calculating a key and/or a file location. For example, the trusted computer may calculate the key and/or a file location for the untrusted computer, without first receive a request for the key and/or file location. In another example, a request for the key and/or file location may be received from an untrusted entity. Further in some examples, the process 600 may end at 606, where the process 600 may include transmitting a notification to the untrusted entity. For example, the notification can include an identification of the file location. The untrusted entity can be configured to retrieve the data file from the file location independent of identification of a providing entity.

Figure 7:
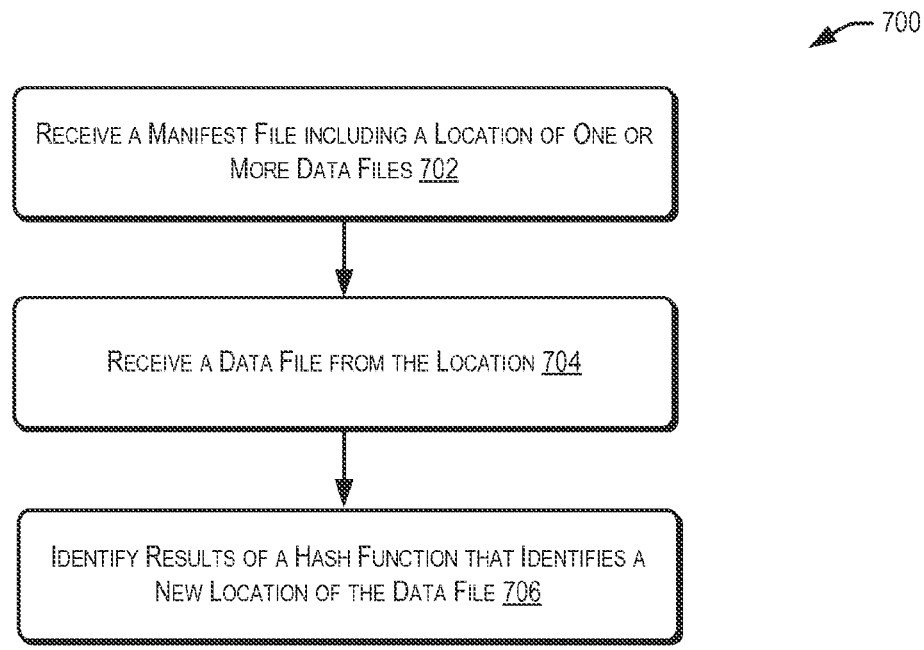
FIG. 7 illustrates an example flow diagram providing data transmissions to an untrusted entity, according to at least one example.

FIG. 7 illustrates an example flow diagram providing data transmissions to an untrusted entity, according to at least one example. In some examples, the one or more trusted computers 210 (e.g., utilizing at least one of the manifest file analysis module 236, the fetch/cache module 238, the protocol module 240, and/or the hashing module 242), the one or more untrusted computer 250 (e.g., utilizing at least one of the item provider module 254 and/or data module 256), the one or more transitive file computers 260 (e.g., utilizing at least one of the hashing module 264 and/or data retrieval module 266), or one or more user devices 204 shown in FIG. 2 may perform the process 700 of FIG. 7. The process 700 may begin at 702 by receiving a manifest file, the manifest file including a location of one or more data files. At 704, the process 700 may include receiving a data file of the one or more data files from the location. Further in some examples, the process 700 may end at 706, where the process 700 may include identifying results of a hash function for the data file that identifies a new location of the data file. For example, the results of the hash function may be identified when a request is received to access the data file.

Figure 8:
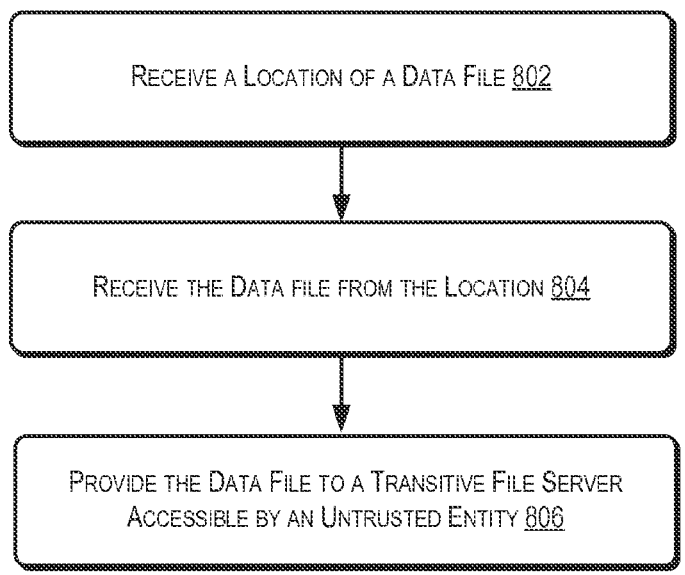
FIG. 8 illustrates an example flow diagram providing data transmissions to an untrusted entity, according to at least one example.

FIG. 8 illustrates an example flow diagram providing data transmissions to an untrusted entity, according to at least one example. In some examples, the one or more trusted computers 210 (e.g., utilizing at least one of the manifest file analysis module 236, the fetch/cache module 238, the protocol module 240, and/or the hashing module 242), the one or more untrusted computer 250 (e.g., utilizing at least one of the item provider module 254 and/or data module 256), the one or more transitive file computers 260 (e.g., utilizing at least one of the hashing module 264 and/or data retrieval module 266), or one or more user devices 204 shown in FIG. 2 may perform the process 800 of FIG. 8. The process 800 may begin at 802 by receiving a location of a data file. At 804, the process 800 may include receiving the data file from the location. Further in some examples, the process 800 may end at 806, where the process 800 may include provide the data file to a transitive file server accessible by an untrusted entity. For example, the untrusted entity may be enabled to receive the data file from the transitive file server independent of identification of a providing entity and provide the data file to a user.

Illustrative methods and systems for providing image analysis/management are described above. Some or all of these systems and methods may, but need not, be implemented at least partially by architectures such as those shown at least in FIGS. 1-8 above.

Figure 9:
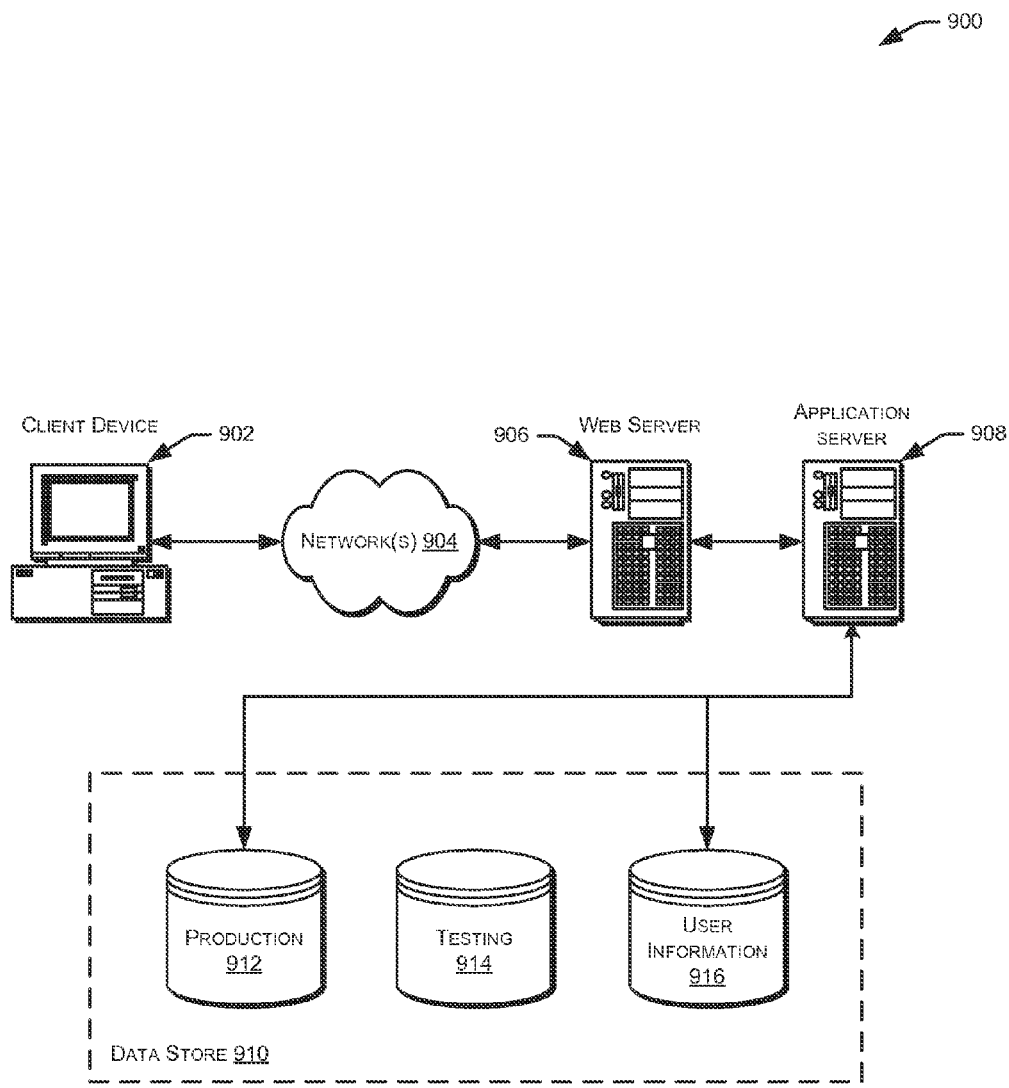
FIG. 9 illustrates an environment in which various embodiments of providing data transmissions to an untrusted entity described herein can be implemented, according to at least one example.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, Visual C#® or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, a location of a data file within a storage device, the location of the data file included in a manifest file received at the computer system from an item provider;
   receiving, by the computer system, a copy of the data file from the storage device based at least in part on the location;
   identifying results of a hash function for the copy of the data file;
   calculating a key and a transitive file location, the transitive file location associated with the results of the hash function;
   providing, by the computer system, the copy of the data file to the transitive file location; and
   transmitting, by the computer system, a notification to an untrusted server, the notification including an identification of the transitive file location and the key, the untrusted server configured to retrieve the copy of the data file from the transitive file location independent of identification of the item provider, and the untrusted server configured to enable the copy of the data file to be provided to a user.

2. The computer-implemented method of claim 1, wherein the copy of the data file is provided to the transitive file location via a user datagram protocol (UDP).

3. The computer-implemented method of claim 1, wherein the untrusted server receives instructions to enable the untrusted server to provide web hosting services based in part on the instructions.

4. The computer-implemented method of claim 3, wherein the instructions include hypertext markup language (HTML) or server-side scripting instructions.

5. The computer-implemented method of claim 3, wherein the instructions enable the untrusted server to retrieve at least one of images, text, or multimedia data for the item provider.

6. A computer-implemented method performed by a set of trusted servers, comprising:
   receiving a data file from an item provider;
   calculating a key for the data file;
   determining a file location for the data file in a transitive file server;
   providing the data file to the transitive file server; and
   transmitting a notification to an untrusted server, the notification including the key and an identification of the transitive file server, the untrusted server enabled to retrieve the data file from the transitive file server independent of identification of the item provider that provided the data file to the set of trusted servers, and the untrusted server configured to enable the data file to be provided to a user.

7. The computer-implemented method of claim 6, wherein the data file is provided to the transitive file server via a user datagram protocol (UDP).

8. The computer-implemented method of claim 6, wherein the data file provided to the transitive file server is removed after the untrusted server retrieves the data file.

9. The computer-implemented method of claim 6, wherein the transitive file server is associated with results of a hash function.

10. The computer-implemented method of claim 9, wherein the results of the hash function are associated with an automatic process for identifying the transitive file server.

11. The computer-implemented method of claim 6, further comprising receiving a manifest file from the item provider, the manifest file including an originating network location of the data file, the originating network location being a location of the data file before the data file is provided to the transitive file server.

12. The computer-implemented method of claim 6, wherein the transitive file server is inaccessible by the untrusted server when the data file is provided to the transitive file server.

13. The computer-implemented method of claim 6, wherein the transitive file server is located remote from the untrusted server and includes a data store associated with a mailbox server.

14. The computer-implemented method of claim 6, wherein the untrusted server is enabled to retrieve the data file from the transitive file server through a multifactor authentication process.

15. The computer-implemented method of claim 6, further comprising receiving the data file at a trusted server of the set of trusted servers from the item provider before the data file is provided to the transitive file server.

16. The computer-implemented method of claim 6, further comprising limiting access of previously retrieved data of the data file to the untrusted server by instructing the transitive file server to remove the data file after it is retrieved by the untrusted server.

17. One or more computer-readable non-transitory storage media collectively storing computer-executable instructions that, when executed by a set of trusted servers, configure a trusted server in the set of trusted servers to collectively perform operations comprising:
   receiving a data file from an item provider at the trusted server;
   calculating a hash key for the data file;
   determining a location for the data file in a transitive file server external to the trusted server;
   providing the data file to the transitive file server; and
   transmitting a notification to an untrusted server, the notification including the hash key and an identification of the location of the data file in the transitive file server, the untrusted server enabled to retrieve the data file from the transitive file server independent of identification of the item provider, and the untrusted server configured to enable the data file to be provided to a user.

18. The one or more computer-readable non-transitory storage media of claim 17, wherein the item provider is a merchant of an electronic marketplace and the data file comprises information associated with items offered by the merchant in the electronic marketplace.

19. The one or more computer-readable non-transitory storage media of claim 17, wherein the data file is cached by at least one of a distributed server, a trusted file server, an application programming interface (API) server, or the transitive file server.

20. A system associated with a set of trusted servers, comprising:
    a memory that stores computer-executable instructions; and
    a processor configured to access the memory, wherein the processor is further configured to execute the computer-executable instructions to collectively at least:
        receive a location of a data file received from an item provider, the location of the data file identified by the item provider;
        receive the data file from the location identified by the item provider;
        determine a file location for the data file in a transitive file server;
        provide the data file to the transitive file server that is accessible by an untrusted server; and
        transmit a notification to the untrusted server, the notification including an identification of the file location in the transitive file server, a server location of the transitive file server being different from the location of the data file identified by the item provider, and the untrusted server being enabled to receive the data file from the transitive file server independent of identification of the item provider, and the untrusted server configured to enable the data file to be provided to a user.

21. The system of claim 20, wherein the location of the data file is received in a manifest file from the item provider.

22. The system of claim 20, wherein the data file is received from a data provider other than the item provider.

23. The system of claim 20, wherein the data file is provided at an address associated with the transitive file server, the address determined based in part on results of a hash function used to generate the address.

24. The system of claim 20, wherein the untrusted server is enabled to receive the data file based in part on providing a symmetric key for authentication.

\* \* \* \* \*